(12) United States Patent
Adachi et al.

(10) Patent No.: US 10,417,553 B2
(45) Date of Patent: Sep. 17, 2019

(54) QUANTUM-ASSISTED TRAINING OF NEURAL NETWORKS

(71) Applicant: Lockheed Martin Corporation, Bethesda, MD (US)

(72) Inventors: Steven H. Adachi, San Ramon, CA (US); Daniel M. Davenport, Rustburg, VA (US); Maxwell P. Henderson, Philadelphia, PA (US)

(73) Assignee: Lockheed Martin Corporation, Bethesda, MD (US)

(*) Notice: Subject to any disclaimer, the term of this patent is extended or adjusted under 35 U.S.C. 154(b) by 591 days.

(21) Appl. No.: 14/702,203

(22) Filed: May 1, 2015

(65) Prior Publication Data

US 2015/0317558 A1    Nov. 5, 2015

Related U.S. Application Data

(60) Provisional application No. 61/987,154, filed on May 1, 2014.

(51) Int. Cl.
*G06N 3/04* (2006.01)
*G06N 10/00* (2019.01)
*G06N 3/06* (2006.01)

(52) U.S. Cl.
CPC .............. *G06N 3/04* (2013.01); *G06N 3/06* (2013.01); *G06N 10/00* (2019.01)

(58) Field of Classification Search
CPC ............ G06N 3/04; G06N 3/06; G06N 3/063; G06N 10/00; G06N 99/002
See application file for complete search history.

(56) References Cited

U.S. PATENT DOCUMENTS 7,135,701 B2 * 11/2006 Amin ............... B82Y 10/00
257/31

OTHER PUBLICATIONS

Kouda, Noriaki et al "Qubit Neural Network and Its Efficiency" 2003 [Online] Downloaded Nov. 21, 2017 https://link.springer.com/content/pdf/10.1007%2F978-3-540-45226-3_42.pdf.*

Roux, Nicolas and Yoshua Bengio "Representational Power of Restricted Boltzmann Machines and Deep Belief Networks" 2008 [Online] Downlaoded Nov. 21, 2017 https://www.microsoft.com/en-us/research/wp-content/uploads/2016/02/representational_power.pdf.*

(Continued)

*Primary Examiner* — Ben M Rifkin
(74) *Attorney, Agent, or Firm* — Morgan, Lewis & Bockius LLP

(57) ABSTRACT

Aspects of the disclosure provide a method for configuring a Quantum Annealing (QA) device. Then QA device has a plurality of qubits and a plurality of couplers at overlapping intersections of the qubits. The method includes mapping a node of a neural network that have a plurality of nodes and connections between the nodes to a qubit in the QA device, and mapping a connection of the neural network to a coupler at an intersection in the QA device where two qubits corresponding to two nodes connected by the connection intersect. The method further includes mapping a node of the neural network to a chain of qubits. In an embodiment, a coupling between qubits in the chain is configured to be a ferromagnetic coupling in order to map the node of the neural network to the chain of qubits.

17 Claims, 5 Drawing Sheets

(56) References Cited

OTHER PUBLICATIONS

Gottesman, Daniel "Fault-Tolerant Quantum Computation" Aug. 2007 [Online] downlaoded Nov. 21, 2017 https://arxiv.org/pdf/quant-ph/0701112.pdf.*
Steane, Andrew "Fast fault-tolerant filtering of Quantum codewords" Apr. 2004 [Online] Downloaded Nov. 21, 2017 https://arxiv.org/pdf/quant-ph/0202036.pdf.*
Wiese, Uwe-Jens. "Ultracold quantum gasses and lattice systems: quantum simulation of lattice gauge theories" Jul. 24, 2013 [Online] Downloaded Nov. 21, 2017 http://onlinelibrary.wiley.com/doi/10.1002/andp.201300104/epdf.*
Le, Q.V., et al., Building high-level features using large scale unsupervised learning. ICML, 2012. http://static.googleusercontent.com/media/research.google.com/en/us/archive/unsupervised_icml2012.pdf.
Neven, H., Google Workshop on Quantum Biology: Welcome and Introduction, Oct. 22, 2010. https://www.youtube.com/watch?v=pSe8mBWeeYM.
Venturelli, D., et al., (2014) Quantum Optimization of Fully-Connected Spin Glasses. http://arxiv.org/abs/1406.7553.
Dumoulin, V., et al., (2013) On the Challenges of Physical Implementations of RBMs. http://arxiv.org/abs/1312.5258.
Denil, M.,et al., (2011). Toward the implementation of a quantum RBM. NIPS*2011 Workshop on Deep Learning and Unsupervised Feature Learning. http://deeplearningworkshopnips2011.files.wordpress.com/2011/12/27.pdf.
Rose, G., (2014) First ever DBM trained using a quantum computer. https://dwave.wordpress.com/2014/01/06/first-ever-dbm-trained-using-a-quantum-computer/.
Montavon, G., et al., (2012) Deep Boltzmann Machines and the Centering Trick. In G. Montavon, G. B. Orr, K.-R. Müller (Eds.), Neural Networks: Tricks of the Trade, 2nd edn, Springer LNCS 7700. http://gregoire.montavon.name/publications/montavon-lncs12.pdf.
Koller, D., et al., Probabilistic Graphical Models: Principles and Techniques, MIT Press, Cambridge MA (2009) pp. 428-429.
Hinton, G. E. (2002) Training Products of Experts by Minimizing Contrastive Divergence. Neural Computation, 14, pp. 1771-1800. http://www.cs.toronto.edu/~hinton/absps/nccd.pdf.
Hinton, G. E. et al., (2006). A fast learning algorithm for deep belief nets. Neural Computation 18 (7): 1527-1554. http://www.cs.toronto.edu/~hinton/absps/ncfast.pdf.
Rumelhart, D.E., et al., (1986) Learning representations by back-propagating errors. Nature, vol. 323, 1986, pp. 533-536. http://www.nature.com/nature/journal/v323/n6088/abs/323533a0.html.
Tanaka, M., Deep Neural Network Toolbox, MATLAB File Exchange (2013). http://www.mathworks.com/matlabcentral/fileexchange/42853-deep-neural-network.
Schlimmer, J., Congressional Voting Records Data Set, UC Irvine Machine Learning Repository (1987). http://archive.ics.uci.edu/ml/datasets/Congressional+Voting+Records.
LeCun, Y., et al., The MNIST database of handwritten digits. http://yann.lecun.com/exdb/mnist/.
Fujita, "Quantum Gauged Neural Network: U(1) Gauge Theory," Oct. 16, 2002, retrieved from http://arxiv.org/pdf/cond-mat/0207023.pdf, 8 pages.
Nakamiya et al., "Quantum Neural Networks Composed of Kane's Qubits," Journal of Applied Physics, 2006, vol. 45, No. 10A, pp. 8030-8034.
European Office Action from European Patent Application No. 15723604.3, dated Jan. 8, 2019, 6 pages.

* cited by examiner

| NEURAL NETWORK PARAMETERS | TOTAL NUMBER OF NODES | TOTAL NUMBER OF QUBITS USED | MAXIMUM CHAIN LENGTH |
|---|---|---|---|
| 7/8/1 | 16 | 32 | 2 |
| 4/8/4 | 16 | 32 | 2 |
| 4/4/4/4/4 | 20 | 32 | 2 |
| 15/16/1 | 32 | 128 | 4 |
| 8/16/8 | 32 | 128 | 4 |
| 8/8/8/8/8 | 40 | 128 | 4 |
| 31/32/1 | 64 | 512 | 8 |
| 16/32/16 | 64 | 512 | 8 |
| 16/16/16/16/16 | 80 | 512 | 8 |

QUANTUM-ASSISTED TRAINING OF NEURAL NETWORKS

INCORPORATION BY REFERENCE

This present disclosure claims the benefit of U.S. Provisional Application No. 61/987,154, "Quantum neural networks" filed on May 1, 2014, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Neural networks running on conventional computing platforms are widely used for various applications such as "face tagging", handwriting recognition, breast cancer diagnosis, and the like.

It is well-known that training of neural networks can be computationally very intensive. For example, training an image processing system to recognize handwritten digits 0-9 may take about one week on a 3 GHz Xeon processor. More complicated tasks, such as handwriting recognition for a full alphanumeric character set, speech recognition, and image recognition, take even longer. For example, training a face recognition system can take the equivalent of roughly 10,000 cores running for a week.

SUMMARY

Aspects of the disclosure provide a method for configuring a Quantum Annealing (QA) device. The QA device has a plurality of qubits and a plurality of couplers at overlapping intersections of the qubits. The method can include mapping a node of a neural network that have a plurality of nodes and connections between the nodes to a qubit in the QA device, and mapping a connection of the neural network to a coupler at an intersection in the QA device where two qubits corresponding to two nodes connected by the connection intersect. The method can further include mapping a node of the neural network to a chain of qubits. In an embodiment, a coupling between qubits in the chain is configured to be a ferromagnetic coupling in order to map the node of the neural network to the chain of qubits.

In an exemplary embodiment, the neural network is a deep learning neural network.

Embodiments of the method can include configuring a coupler associated with a faulty qubit in the QA device with a zero weight, and setting a connection associated with a node in the neural network that is mapped to the faulty qubit with a zero weight. In an embodiment, quantum samples that include states of qubits in a chain of qubits that disagree with each other are discarded when a sample average is computed. In another embodiment, a state value of a majority of qubits that agree with each other in a chain of qubits including a faulty qubit is used as a state value of the chain of qubits in a quantum sample.

Embodiments of the method include applying a gauge transformation to qubits of the QA device. In an example, the gauge transformation is a basket weave gauge transformation. In an embodiment, applying a gauge transformation to qubits of the QA device can include generating quantum samples from qubits in the QA device with multiple different gauge transformation arrangements, and averaging the quantum samples to calculate a model expectation. In an example, the multiple different gauge transformation arrangements can include one of an identity transformation where no qubits are inverted, a basket weave gauge transformation where a first half of qubits in the QA device are inverted and a second half of qubits are not inverted, a complement of the above basket weave gauge transformation where the second half of the qubits in the QA device are inverted and the first half of the qubits are not inverted, and a negative of the identity transformation where all qubits are inverted.

Embodiments of the method include calibrating a scale factor $\beta_{eff}$ for generating quantum samples from a quantum annealing process. In an embodiment, calibrating the scale factor $\beta_{eff}$ can include constructing a restricted Boltzmann machine (RBM) of a particular size, choosing a particular value for the scale factor $\beta_{eff}$, performing the quantum annealing process to generate the quantum samples using a quotient of an energy functional of the RBM being divided by the scale factor $\beta_{eff}$ as a final Hamiltonian, repeating choosing a particular value, performing a quantum annealing process for multiple times, and determining a value of the scale factor $\beta_{eff}$ that leads to the smallest difference between model expectations of the RBM based on the quantum samples and model expectations of the RBM based on the energy functional of the RBM. In an example, calibrating the scale factor $\beta_{eff}$ can further include calculating model expectations of the RBM based on the quantum samples, calculating model expectations of the RBM based on the energy functional of the RBM and comparing model expectations of the RBM based on the quantum samples with model expectations of the RBM based on the energy functional of the RBM.

Aspects of the disclosure provide a method for training a neural network using a quantum annealing (QA) device. The QA device has qubits configured with biases and couplers configured with weights. An original restricted Boltzmann machine (RBM) of one layer of the neural network is mapped onto the QA device that is configured to act as a quantum RBM. The method can include initializing the biases and the weights of the original RBM and the quantum RBM to random values. The method can further include generating quantum samples at the QA device, calculating an update to biases and weights for the original RBM and the quantum RBM with a classical computer based on the quantum samples and using the update to biases and weights to perform a next iteration of training the neural network.

In an embodiment, in order to generate quantum samples at the QA device, a quotient of an energy functional of the RBM being divided by the scale factor $\beta_{eff}$ is used as a final Hamiltonian for a quantum annealing process at the QA device and the quantum annealing process is run for multiple times to generate multiple quantum samples.

In an embodiment, in order to calculate the update to biases and weights for the original RBM and the quantum RBM, multiple quantum samples are averaged to calculate a model expectation that is consequently used for calculating updates to the biases and weights.

In an embodiment, in order to use the update to biases and weights to perform the next iteration of training the neural network, the biases and the weights of the original RBM and the quantum RBM are configured with values of the update to biases and weights for the next iteration of training the neural network. In addition, the steps of generating quantum samples, calculating an update to biases and weights, and using the update to biases and weights to perform the next iteration are repeated.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Generally, a neural network consists of nodes and connections between the nodes. The nodes are typically arranged in layers, such as visible layers including input and output layers, and hidden layers. In addition, there are biases and weights associated with nodes and connections, respectively. A neural network needs to be trained in order to work properly. During a training process, data of a collection of representative examples are provided to nodes in the input layer or output layer, and biases and weights are updated iteratively.

Figure 1:
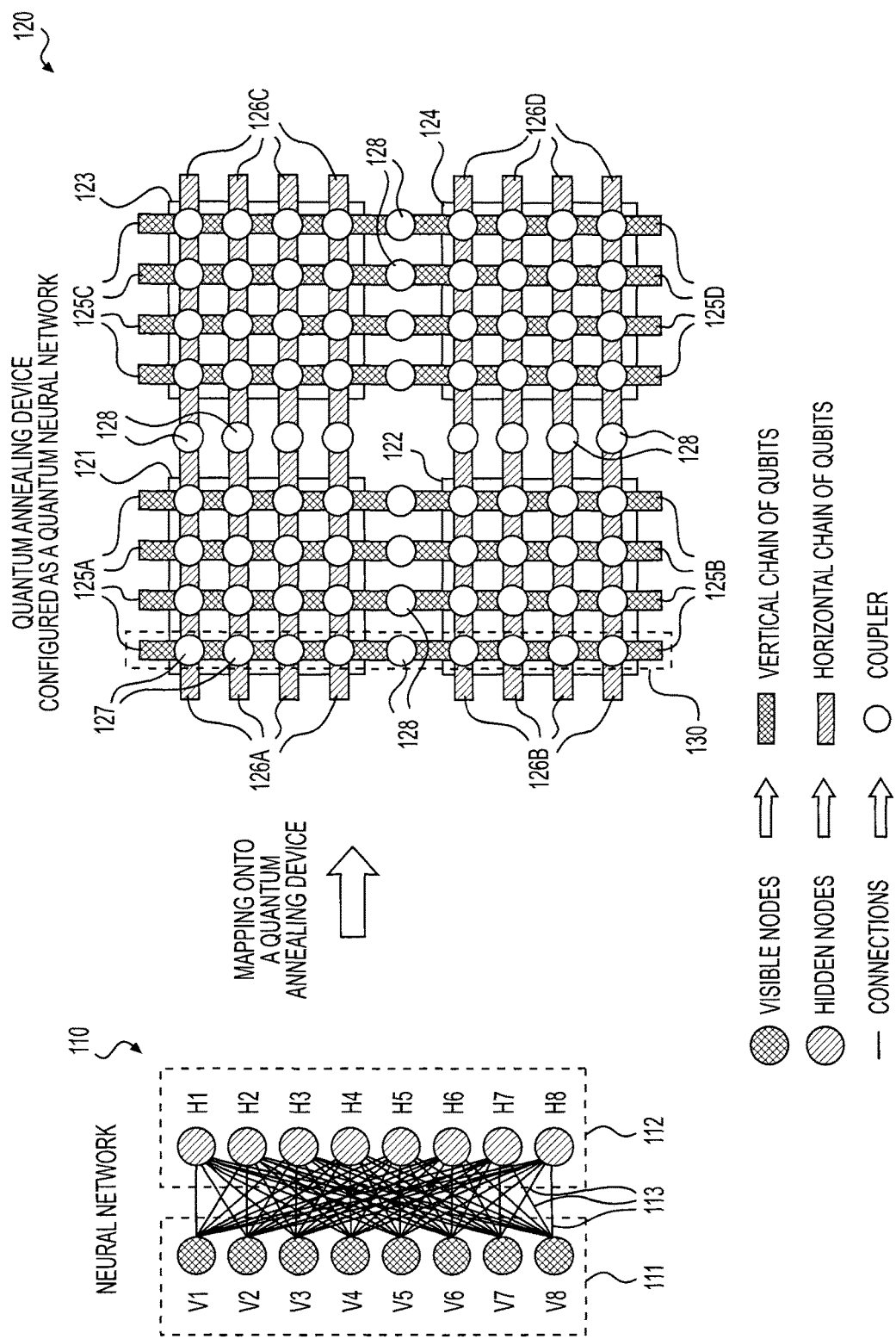
FIG. 1 shows a method for configuring a Quantum Annealing (QA) device to be a quantum neural network according to an embodiment of the disclosure.

As shown, at the left side of FIG. 1, is a specific type of neural network, referred to as a Restricted Boltzmann Machine (RBM) 110. The RBM 110 consists of a visible layer 111 and a hidden layer 112 in an embodiment. The visible layer 111 includes a first plurality of nodes, such as nodes V1-V8, and the hidden layer 112 includes a second plurality of nodes, such as nodes H1-H8. Each node in the neural network 110 represents a stochastic binary variable. In addition, each node of the visible layer 111 can be connected to each node of the hidden layer 112; however, there are no connections between nodes in the visible layer 111 or hidden layer 112.

In the field of Deep Learning, neural networks can be constructed by stacking RBMs forming a deep learning neural network. RBMs are stacked by identifying the hidden layer of one RBM with the visible layer of the next RBM. Types of deep learning neural networks can include Deep Belief Networks (DBNs) and Deep Boltzmann Machines (DBMs).

As shown, at the right side of FIG. 1 is a quantum annealing (QA) device 120 having a plurality of qubits 125A-125D and 126A-126D.

In the field of quantum computing, quantum annealing describes a type of heuristic search algorithm that can be implemented to run on an adiabatic quantum computation (AQC) platform. QA devices provide a hardware implementation of AQC and exploit quantum properties to realize quantum computation. For example, a QA device can be a quantum annealing processor chip manufactured by D-Wave Systems Inc., such as a 128-qubit D-Wave One chip or a 512-qubit D-Wave Two chip.

A qubit is a device storing quantum information in a QA device. A qubit can contain two discrete physical states labeled "0" and "1". However, a qubit can also behave quantum mechanically and be placed in a superposition of 0 and 1, meaning that the qubit can exist in both a 0 and 1 state at the same time.

In the FIG. 1 example, each qubit can be a loop of niobium controlled by Josephson junctions and bias signals. Direction of current in the loop corresponds to a state of the qubit. Niobium loops can be place in a superposition (current running in both directions) when supercooled to temperatures below 20 mK. Pairs of qubits can be coupled with couplers. Couplers can be also fabricated from loops of niobium. Qubits and couplers can be etched onto silicon wafer circuits consisting of three layers, one each of niobium, aluminum oxide ($Al_2O_3$) and aluminum, on a silicon substrate.

As shown in FIG. 1, the QA device 120 includes four unit cells 121-124. Each unit cell 121-124 includes four vertical qubits and four horizontal qubits. For example, the unit cell 121 includes four vertical qubits 125A and four horizontal qubits 126A. Vertical qubits 125A and horizontal qubits 126A overlap and intersect with each other. In addition, the QA device 120 includes a first set of couplers 127 that couples pairs of qubits at each intersection of the pairs of qubits. In operation, biases and weights can be configured to qubits and couplers, respectively, and used for controlling operation of the QA device 120. It is noted that in various embodiments, qubits in a QA device can be arranged in varied ways that can be different from the arrangement of qubits in the FIG. 1 example.

A coupler can be configured with one of three types of couplings. The first type of coupling is referred to as ferromagnetic coupling, or negative coupling, corresponding to when the coupler is configured with a negative weight value. The second type of coupling is referred to as antiferromagnetic coupling, or positive coupling, corresponding to when the coupler is configured with a positive weight value. The third type of coupling is referred to as zero coupling corresponding to when the coupler is configured with a zero weight value meaning no coupling between two qubits.

Additionally, qubits at different unit cells 121-124 can be chained together by a second set of couplers 128 configured with ferromagnetic couplings to form a chain of qubits, so that the chain of qubits acts as a single "virtual" qubit. For example, the far left vertical qubit in the unit cell 121 and the far left vertical qubit in the unit cell 122 can be coupled together by one of the second set of ferromagnetic couplers 128 forming a chain of qubits 130. Similarly, each vertical qubit 125A and 125C can be coupled to each vertical qubit 125B and 125D via the second set of ferromagnetic couplers, respectively, forming a plurality of chains of qubits. In the same way, each horizontal qubit 126A and 126B can be coupled to each horizontal qubit 126C and 126D via the second set of ferromagnetic couplers, respectively, forming a plurality of chains of qubits. For a chain of qubits, the amount of qubits chained is referred to as the length of the chain of qubits. The length of a chain can be two or more than two depending on different configurations of the quantum neural networks. It is noted that FIG. 1 presents a particular example of formation of chains of qubits, and different applications can require different formations of chains of qubits.

According to an aspect of the disclosure, the ferromagnetic couplings can be configured to enforce that qubits chained together agree with each other with a high probability, for example, the chained qubits are in the same state, 0 or 1.

According to an aspect of the disclosure, training deep learning neural networks, such as DBNs and DBMs, on conventional computing platforms is slow and requires heavy computational resources, and a QA device can be configured to act as a neural network and used to speed up the training process of a deep learning neural network.

FIG. 1 illustrates a method for configuring a Quantum Annealing (QA) device to be a quantum neural network. In an embodiment, a neural network is mapped onto a QA device in order to configure the QA device to act as a neural network. The resulting configuration is referred to as a "quantum neural network". To perform the mapping, each node in the neural network is mapped to a qubit in the QA device, and each connection in the neural network is mapped to a coupler, such as one of the first set of couplers in FIG. 1, in the QA device. In addition, a node in the neural network is mapped to a chain of qubits, for example, when a node is connected with more than four other nodes in the neural network. Thus, topology of the neural network is mapped onto the QA device without any change.

In the FIG. 1 example, in an embodiment, visible nodes V1-V8 are mapped to the vertical chains of qubits, respectively, and hidden nodes H1-H8 are mapped to the horizontal chains of qubits. In addition, connections 113 between visible nodes V1-V8 and hidden nodes H1-H2 in the neural network 110 are mapped to the first set of couplers 127.

It is noted that the mapping method shown in FIG. 1 represents a particular arrangement which makes particularly efficient use of the available qubits on the QA device. The method is not restricted to this particular arrangement, and may utilize other arrangements which are less efficient, but may be desirable for other reasons.

It is further noted that the mapping method shown in FIG. 1 represents one example of a specific RBM being mapped to a QA device. More generally, the mapping method may be used to map DBNs or DBMs with varying number of layers, and varying numbers of nodes within each layer, up to certain maximum values which will depend on the size and layout of the QA device. In other words, the mapping method can be scaled up either by increasing a number of nodes per layer, a number of layers, or both.

Figures 2, 3:
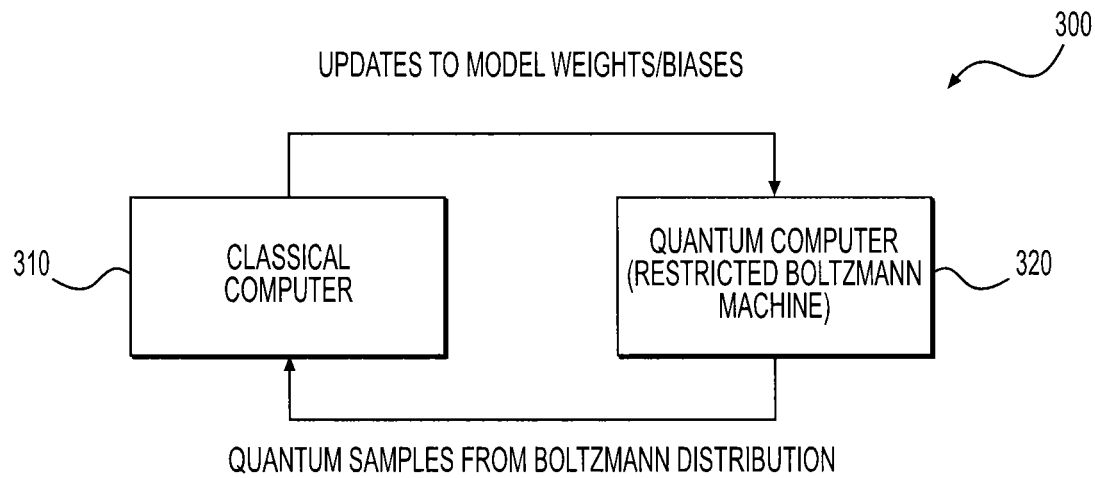
FIG. 2 shows a table illustrating various sizes of neural networks that can be mapped onto a QA device according to an embodiment of the disclosure.
FIG. 3 shows a hybrid classical/quantum computing architecture used for training deep learning networks according to an embodiment of the disclosure.

FIG. 2 shows a table illustrating various sizes of neural networks that can be mapped onto a QA device with 512 qubits, such as a 512-qubit D-Wave Two chip, according to an embodiment of the disclosure.

In the first column of the table in FIG. 2, parameters of neural networks indicative of a size of a neural network are given in a form of a series of numbers in each row. Each number in the series indicates a layer as well as an amount of nodes in the layer. In the second column of the table in FIG. 2, the total numbers of nodes corresponding to each neural networks listed in the first column are listed. In the third column, the total numbers of qubits used for mapping the neural networks listed in the first column are presented. In the far right column, the maximum chain lengths of chains used for each neural network are listed. For example, for a neural network having a neural network parameter of 4/4/4/4/4, the neural network includes five layers and each layer includes four nodes, and the total number of nodes is 20. In addition, the neural network after being mapped to a QA device uses 32 qubits, and the maximum length of chains used in the mapping is 2.

As shown, a neural network having a total number of nodes up to 80 can be mapped onto a 512-qubit QA device. Of course, for a QA device which has faulty qubits, actual limits on the sizes of neural networks that can be mapped onto the QA device can be lower.

FIG. 3 shows a hybrid classical/quantum computing architecture 300 used for training deep learning networks according to an embodiment of the disclosure. The hybrid classical/quantum computing architecture 300 is used for a quantum-assisted training method.

Generally, during a neural network training process, a deep learning neural network is first trained using a set of known examples, after which it may be put through additional phases, such as cross-validation and testing, and finally put into operation. Training may be either supervised (in which case the training data is accompanied by truth labels) or unsupervised (no truth labels). Traditionally, a classical contrastive divergence (CD) training approach is used for training a deep learning neural network, and the training process can be slow and require heavy computational resources.

According to an aspect of the disclosure, the hybrid classical/quantum computing architecture 300 is used for training a deep learning neural network in order to speed up the training process. As shown in FIG. 3, the hybrid classical/quantum computing architecture 300 includes a classical computer 310 and a quantum computer 320. The quantum computer 320, such as a QA device, is configured to act as a neural network, such as a restricted Boltzmann machine (RBM) and is used to generate quantum samples from the Boltzmann distribution of the RBM. The classical computer 310 computes updates of weights and biases for a next iteration of a deep learning network training process based on the quantum samples. The neural network configured at the quantum computer 320 is updated with the updates of weights and biases, thus, forming a loop for training the deep learning network.

The above hybrid classical/quantum computing architecture 300 is explained in detail below.

Generally, deep learning neural networks are constructed by stacking RBMs, and training a deep learning neural network is done by training one RBM layer at a time. An RBM consists of stochastic binary variables arranged into a "visible" layer and a "hidden" layer, where inter-layer connections are allowed but intra-layer connections are forbidden. Thus, the connectivity of an RBM can be represented as an undirected bipartite graph.

It is well know that a joint probability distribution for an RBM can be defined by a Gibbs distribution with an energy functional:

$$E(v, h) = -\sum_i b_i v_i - \sum_j c_j h_j - \sum_{ij} W_{ij} v_i h_j \quad v_i, h_j \in \{0, 1\} \quad (1a)$$

$$P(v, h) = \frac{1}{Z} \exp(-E(v, h)) \quad (1b)$$

where $v_i$ and $h_j$ represent stochastic binary variables of the visible and hidden nodes, respectively; $b_i$ and $c_j$ represent biases associated with the visible and hidden nodes; $W_{ij}$ represents weights associated with connections between the nodes $v_i$ and $h_j$; and the normalization constant $$Z = \sum_{\{v_k\}} \sum_{\{h_l\}} \exp\left(\sum_k b_k v_k + \sum_l c_l h_l + \sum_{kl} W_{kl} v_k h_l\right) \quad (1c)$$

is known in physics as the partition function.

Because of the bipartite graph structure, forward and reverse conditional probability distributions for the RBM are both simple sigmoid functions:

$$P(h_j = 1 \mid v) = sigm\left(c_j + \sum_i W_{ij} v_i\right) \quad (2a)$$

$$P(v_i = 1 \mid h) = sigm\left(b_i + \sum_j W_{ij} h_j\right) \quad (2b)$$

The goal of training a deep learning neural network is to determine the weights and biases that maximize a log-likelihood log P of training data. The weights $w_{ij}$, biases $b_i$ and $c_j$ are updated to follow the direction of increasing gradient. Therefore, the log P at each iteration is increased and eventually reaches a maximum value of log P. During the training process, a fixed training data vector V is supplied to the RBM, and a gradient of the log-likelihood with respect to the weights $w_{ij}$, biases $b_i$ and $c_j$ can be expressed as:

$$\frac{\partial \log P}{\partial w_{ij}} = \langle v_i h_j \rangle_{data} - \langle v_i h_j \rangle_{model} \quad (3a)$$

$$\frac{\partial \log P}{\partial b_i} = \langle v_i \rangle_{data} - \langle v_i \rangle_{model} \quad (3b)$$

$$\frac{\partial \log P}{\partial c_j} = \langle h_j \rangle_{data} - \langle h_j \rangle_{model} \quad (3c)$$

Updates to the weights and biases can be calculated using the gradient formulas (3a)-(3c):

$$w_{ij}^{(t+1)} = \alpha w_{ij}^{(t)} + \epsilon[\langle v_i h_j \rangle_{data} - \langle v_i h_j \rangle_{model}] \quad (4a)$$

$$b_i^{(t+1)} = \alpha b_i^{(t)} + \epsilon[\langle v_i h_j \rangle_{data} - \langle v_i h_j \rangle_{model}] \quad (4b)$$

$$c_j^{(t+1)} = \alpha c_j^{(t)} + \epsilon[\langle v_i h_j \rangle_{data} - \langle v_i h_j \rangle_{model}] \quad (4c)$$

where $\alpha$ is the momentum and $\epsilon$ is the learning rate.

As shown, the terms $\langle v_i h_j \rangle_{data}$, $\langle v_i \rangle_{data}$, and $\langle h_j \rangle_{data}$ referred to as data expectations, are clamped expectations with training data vector V fixed and can be computed from the fixed training data. For a single training data vector V, the data expectations are computed using the conditional probability distribution for the hidden layer H conditioned on the visible values V:

$$\langle v_i h_j \rangle_{data} = \sum_{\{h_k\}} v_i h_j P(H \mid V) = v_i P(h_j = 1 \mid V) = v_i sigm\left(c_j + \sum_k W_{kj} v_k\right) \quad (5a)$$

$$\langle h_j \rangle_{data} = \sum_{\{h_k\}} h_j P(H \mid V) = P(h_j = 1 \mid V) = sigm\left(c_j + \sum_k W_{kj} v_k\right) \quad (5b)$$

$$\langle v_i \rangle_{data} = v_i \quad (5c)$$

If the training data is applied in a batch of vectors V, then a further average is taken over the batch.

The terms $\langle v_i h_j \rangle_{model}$, $\langle v_i \rangle_{model}$, and $\langle h_j \rangle_{model}$, referred to as model expectations, can be computed over the joint probability distribution of H and V:

$$\langle v_i h_j \rangle_{model} = \frac{1}{Z} \sum_{\{v_k\}} \sum_{\{h_l\}} v_i h_j \exp\left(\sum_k b_k v_k + \sum_l c_l h_l + \sum_{kl} W_{kl} v_k h_l\right) \quad (6a)$$

$$\langle v_i \rangle_{model} = \frac{1}{Z} \sum_{\{v_k\}} \sum_{\{h_l\}} v_i \exp\left(\sum_k b_k v_k + \sum_l c_l h_l + \sum_{kl} W_{kl} v_k h_l\right) \quad (6b)$$

$$\langle h_j \rangle_{model} = \frac{1}{Z} \sum_{\{v_k\}} \sum_{\{h_l\}} h_j \exp\left(\sum_k b_k v_k + \sum_l c_l h_l + \sum_{kl} W_{kl} v_k h_l\right) \quad (6c)$$

where $$Z = \sum_{\{v_k\}} \sum_{\{h_l\}} \exp\left(\sum_k b_k v_k + \sum_l c_l h_l + \sum_{kl} W_{kl} v_k h_l\right) \quad (6d)$$

In an embodiment, the model expectations $\langle v_i h_j \rangle_{model}$, $\langle v_i \rangle_{model}$, and $\langle h_j \rangle_{model}$ can be calculated (estimated) using quantum samples generated from the quantum computer 320. Accordingly, in the hybrid classical/quantum computing architecture 300, the quantum computer 320, such as a QA device, can be configured to be a quantum neural network, such as a RBM in particular, and generate quantum samples, while the classical computer 310 can be configured to perform the calculation of updates to weights and biases of the quantum neural network using the formulas (3a)-(3c). In the hybrid classical/quantum computing architecture 300, a RBM layer of a neural network is referred to as an original RBM while an RBM configured at the quantum computer 320 is referred to as a quantum RBM.

In an embodiment, a QA device is configured to act as a quantum RBM and generate quantum samples, and multiple quantum samples are generated and averaged to estimate the model expectations $\langle v_i h_j \rangle_{model}$, $\langle v_i \rangle_{model}$, and $\langle h_j \rangle_{model}$. This process is explained in detail below.

Generally, in a quantum annealing process at a QA device, a Hamiltonian of a system consisted of qubits in the QA device evolves over time from an initial Hamiltonian $\mathcal{H}_i$ to a final Hamiltonian $\mathcal{H}_f$:

$$\mathcal{H}(t) = t\mathcal{H}_i + (1-t)\mathcal{H}_f, 0 \le t \le 1. \quad (7)$$

In an ideal adiabatic evolution, if the system starts in the ground state of $\mathcal{H}_i$ and the evolution proceeds slowly enough to satisfy the conditions of the adiabatic theorem, then the system will end up in the ground state of $\mathcal{H}_f$. However in an actual hardware implementation of quantum annealing, such as a D-Wave Two processor chip, there is inevitably some interaction between the qubits and their environment, which leads to a nonzero probability that the evolution will end up in an excited state. The distribution of final states of qubits in the QA device can be modeled approximately as a Boltzmann distribution:

$$P(S) = \frac{1}{Z}\exp(-\beta_{eff}\mathcal{H}_f(S)) \quad (8)$$

In the embodiment, the quotient of the RBM energy functional, such as the equation (1a) being divided by a scale factor $\beta_{eff}$ is used as the final Hamiltonian $\mathcal{H}_f$ in the above equation:

$$P = \frac{1}{Z}\exp(-\beta_{eff}\mathcal{H}_f) = \frac{1}{Z}\exp\left(-\beta_{eff}\left(\frac{1}{\beta_{eff}}E\right)\right) = \frac{1}{Z}\exp(-E) \quad (9)$$

which is equivalent to the joint probability distribution of the original RBM. Thus, the QA device is used as a sampling engine to generate quantum samples: final states of qubits in the QA device obtained after a quantum annealing process constitute a sample from the Boltzmann distribution of qubit states of the QA device. The scale factor $\beta_{eff}$ can be found through tests in an embodiment.

Further, in the embodiment, based on the quantum samples generated at the QA device, multiple samples are used to estimate the model expectations $\langle v_i h_j \rangle_{model}$, $\langle v_i \rangle_{model}$, and $\langle h_i \rangle_{model}$. Particularly, the quantum annealing process is run N times for a training data vector V, and the sample averages $$\overline{v_i h_j} = \frac{1}{N}\sum_{n=1}^{N} v_i^{(n)} h_j^{(n)} \quad (10a)$$

$$\overline{v_i} = \frac{1}{N}\sum_{n=1}^{N} v_i^{(n)} \quad (10b)$$

$$\overline{h_j} = \frac{1}{N}\sum_{n=1}^{N} h_j^{(n)} \quad (10c)$$

are used as estimates of the model expectation $\langle v_i h_j \rangle_{model}$, $\langle v_i \rangle_{model}$ and $\langle h_i \rangle_{model}$.

Figure 4:
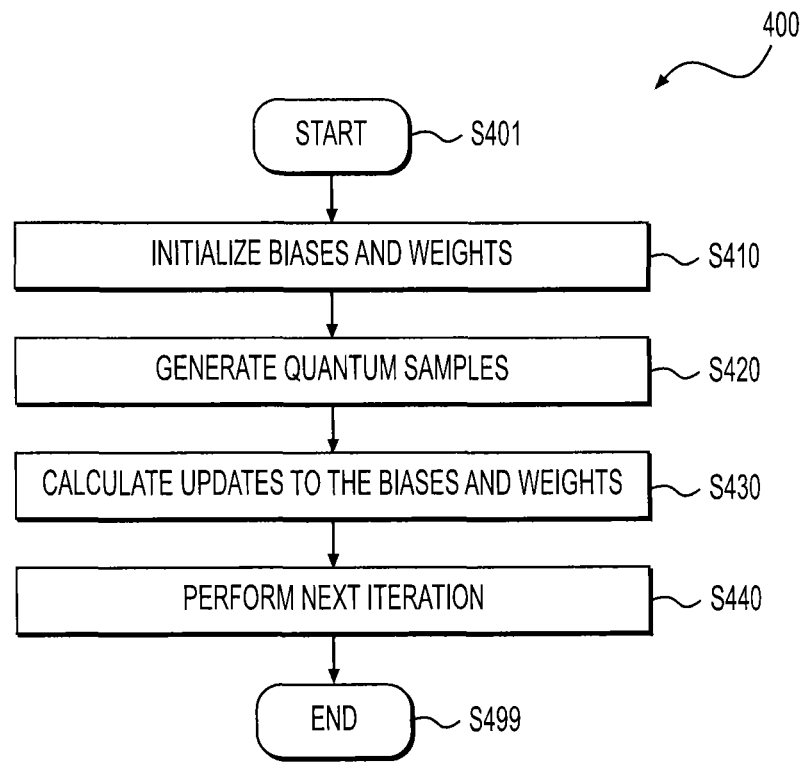
FIG. 4 shows a flow chart of a quantum-assisted training process for training neural networks according to an embodiment of the disclosure.

FIG. 4 shows a flow chart of a quantum-assisted training process for training neural networks according to an embodiment of the disclosure. In an embodiment, the neural network to be trained is a deep learning neural network. The process starts at S401 and proceeds to S410.

At S410, an original RBM of one layer of the deep learning neural network is mapped onto a QA device, and biases and weights of the original RBM and the quantum RBM corresponding to the original RBM configured at the QA device are initialized to random values;

At S420, quantum samples are generated at the QA device. A quotient of an energy functional of the RBM being divided by a scale factor $\beta_{eff}$ is used as a final Hamiltonian during a quantum annealing process at the QA device. In addition, the quantum annealing process can be run for multiple times to generate multiple quantum samples.

In an embodiment, an RBM layer of a deep learning neural network is first mapped onto a QA device in order to generate quantum samples. The training begins with couplings between qubits set to initial values, for example, the initial values may be randomly chosen. In other embodiments, other ways of choosing the initial values can be applied. It is noted that this initialization step does not apply to the ferromagnetic couplings which are used to "chain" qubits together. Then the QA device is subjected to a quantum annealing process according to standard operation of a QA device. At the end of the quantum annealing process, the final configuration of qubits represents a sample from a joint distribution of the quantum RBM configured on the QA device.

At S430, updates to biases and weights of the RBM configured on the QA device can be calculated with a classical computer based on the quantum samples. Particularly, the multiple quantum samples are averaged to calculate the expectations that are consequently used for calculating updates to the biases and weights.

At S440, the updates to biases and weights calculates at S430 are used to perform a next iteration of the quantum-assisted training process. Particularly, the biases and the weights of the original RBM and the quantum RBM are configured with the values of the update to biases and weights, and the steps S420-S440 are repeated.

Figure 5:
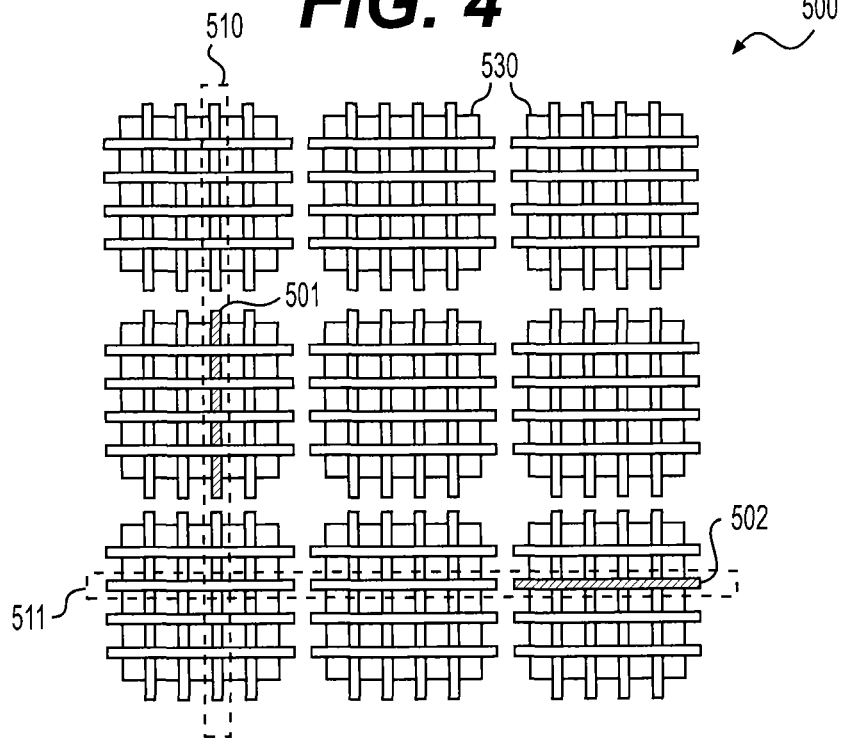
FIG. 5 shows a layout of qubits of a QA device according to an embodiment of the disclosure.

FIG. 5 shows a layout 500 of qubits of a QA device according to an embodiment of the disclosure. As shown, the QA device includes nine unit cells 530 forming a grid of qubits having twelve columns and twelve rows. Qubits 501 and 502 are two faulty qubits that cannot work properly during a quantum annealing process.

According to an aspect of the disclosure, due to the defects presented in a QA device, for example, due to chip fabrication or calibration errors, there can be faulty qubits in the QA device.

In an embodiment, during a quantum neural network configuration process, in order to tolerate the faulty qubits, couplers in the QA device associated with the faulty qubits are configured with a zero weight; at same time, connections of the deep learning neural network associated with the faulty qubits are set with a zero weight. Particularly, in the FIG. 5 example, a layer of a RBM of the deep learning neural network is mapped onto the QA device. The RBM has twelve visible nodes and twelve hidden nodes. The visible nodes are mapped onto the twelve columns of qubits where the qubits in each column form a chain of qubits, while the hidden nodes are mapped onto the twelve rows of qubits where the qubits in each row form a chain of qubits. Accordingly, the chain of qubits 510 includes the faulty qubit 501, and similarly, the chain of qubits 511 includes the faulty qubit 502. In order to tolerate the two faulty qubits, zero weights are configured to the couplers at intersections where the chain of qubits 510 is intersected with the chains of qubits at the twelve rows and the chain of qubits 511 is intersected with the chains of qubits at the twelve columns. At the same time, weights of connections connected with the nodes mapped to the chain of qubits 510 and 512 are set to be zero in the trained deep learning neural network. In an embodiment, it is found that absence of a small number of connections does not substantially degrade the performance of the resulting deep learning neural network.

According an aspect of the disclosure, there is a small probability that qubits in a chain do not agree with each other after a quantum annealing process, and when a faulty qubit is included in the chain of qubits, the probability can increase. In an embodiment, a tunable "voting threshold" parameter r is used to treat the disagreement of the qubits in a chain of qubits. In a first scenario, referred to as strict enforcement, the voting threshold parameter is set as r=1. Under such a voting threshold setting of r=1, quantum samples including states of qubits in a chain that disagree with each other are discarded when the sample averages are computed. In a second scenario, the tunable voting threshold parameter is set to a value between 0.5 and 1, expressed as 0.5<r<1. If, in a quantum sample, for all the chains, a percentage of the qubits in each chain that agree with each other is greater than the value of r, the state values of majority qubits in each chain of qubits that agree with each other are counted for a state value of the chain of qubits. Majority qubits refers to qubits that count for more than 50% of all the qubits in the chain of qubits. If, in a quantum sample, there is a chain where the percentage of the majority qubits in the chain that agree with each other is smaller than r, the quantum sample is discarded when the sample averages are computed. In an example, the voting threshold parameter is set as r=0.8, and a chain of qubits includes ten qubits. A quantum sample is generated at the end of a quantum annealing process, and in the quantum sample, seven of the qubits in the chain have a state value of 1, while the other three of the qubits have a state value of 0. Then this quantum sample will be discarded. In another quantum sample generated at the end of another quantum annealing process, percentage of qubits in each chain that agree with each other is greater than r=0.8, then this sample will be used for calculating a sample average. In the chain of qubits having ten qubits, if nine of the qubits in the chain have a state value of 1, while the other one of the qubits have a state value of 0. Then, the state value of 1 is taken as the state value of the chain of qubits.

Figure 6:
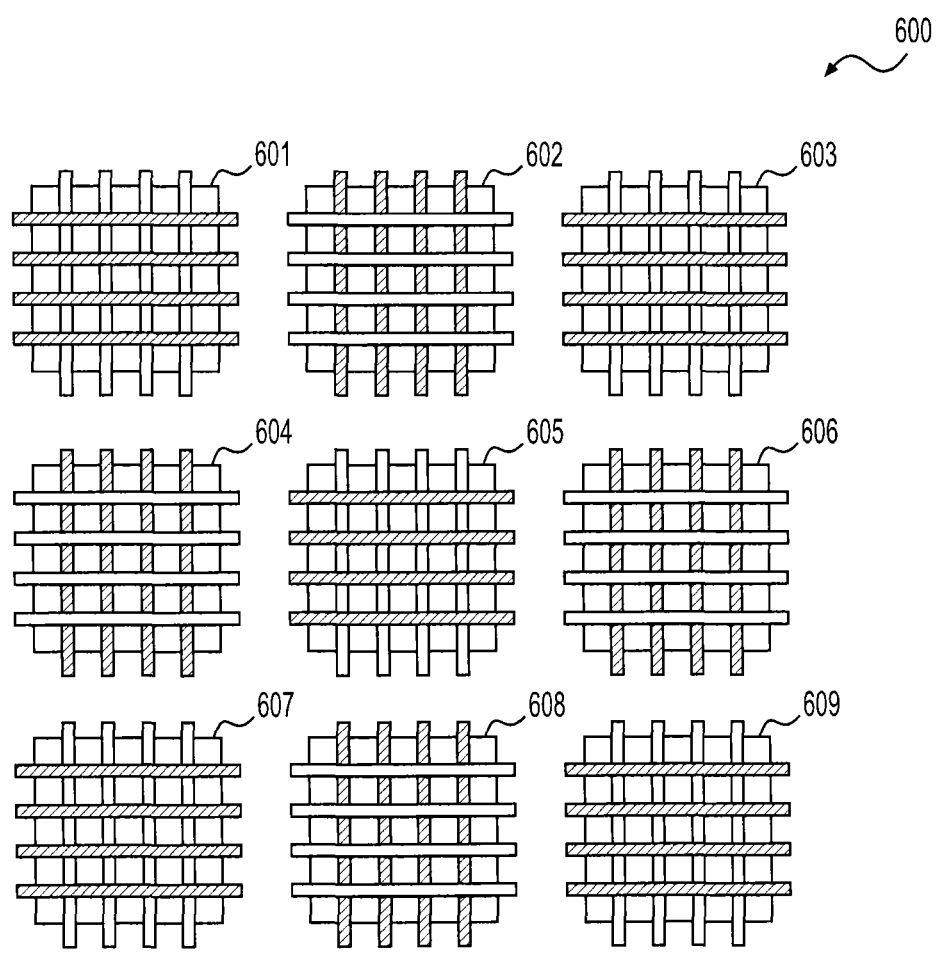
FIG. 6 shows a layout of qubits in a QA device where gauge transformations are used to mitigate intrinsic control error (ICE) according to an embodiment of the disclosure.

FIG. 6 shows a layout of qubits in a QA device where gauge transformations are used to mitigate intrinsic control error (ICE) according to an embodiment of the disclosure.

According to an aspect of the disclosure, a QA device can exhibit ICE. For example, due to physical limitation of control circuit of the QA device, actual values of biases and weights on qubits in the QA device may differ slightly from their configured values. In another example, when adding a weight parameter to a coupling between two qubits, there is a small "leakage" that effectively adds a bias value to the two qubits. Particularly, this leakage effect becomes noticeable in a chain of qubits where multiple qubits are chained together.

In various embodiments, varied gauge transformations can be applied to the qubits of the QA device when configuring the QA device in order to reduce effects of ICEs during a quantum-assisted training process of a deep learning neural network. According to an aspect of the disclosure, gauge transformations invert signs of a subset of biases and weights configured to qubits in a QA device, and help to mitigate the leakage effect in the chained qubits. If a qubit is inverted, its bias changes sign. If two qubits are coupled, and exactly one of them is inverted, then the coupler weight changes sign; otherwise the coupler weight is unchanged.

FIG. 6 shows an exemplary gauge transformation in an embodiment. As shown, there are nine qubit unit cells 601-609 that are adjacent to each other. In each of the unit cells 601/603/605/607/609, all horizontal qubits are inverted by a gauge transformation while all vertical qubits are unchanged. In contrast, in the other neighboring unit cells 602/604/606/608, all vertical qubits are inverted by a gauge transformation while all horizontal qubits are unchanged. Because of the way this pattern alternates from one unit cell to the next adjacent unit cell, the gauge transformation is called a "basket weave" gauge transformation.

In an embodiment, when calculating model expectations based on quantum samples generated from a QA device during a quantum-assisted training process, quantum samples are generated from multiple different gauge transformation arrangements and averaged to calculate the model expectations. For example, multiple different gauge transformation arrangements can include the following cases:

I—identity transformation where no qubits are inverted;
G—basket weave gauge transformation shown in FIG. 6 where a first half of qubits in the QA device are inverted and a second half of qubits are not inverted;
−G—the complement of the basket weave gauge transformation shown in FIG. 6 where the second half of the qubits in the QA device are inverted and the first half of the qubits are not inverted;
−I—the negative of the identity transformation where all qubits are inverted. It is noted that scope of employing multiple gauge transformations as a means of reducing the ICEs is not limited to the basket weave gauge transformation and averaging over the four gauges I, G, −G, and −I. Those skilled in the art will appreciate that employing multiple gauge transformations can easily be generalized to more complicated schemes involving averaging over more than 4 gauges.

Figure 7:
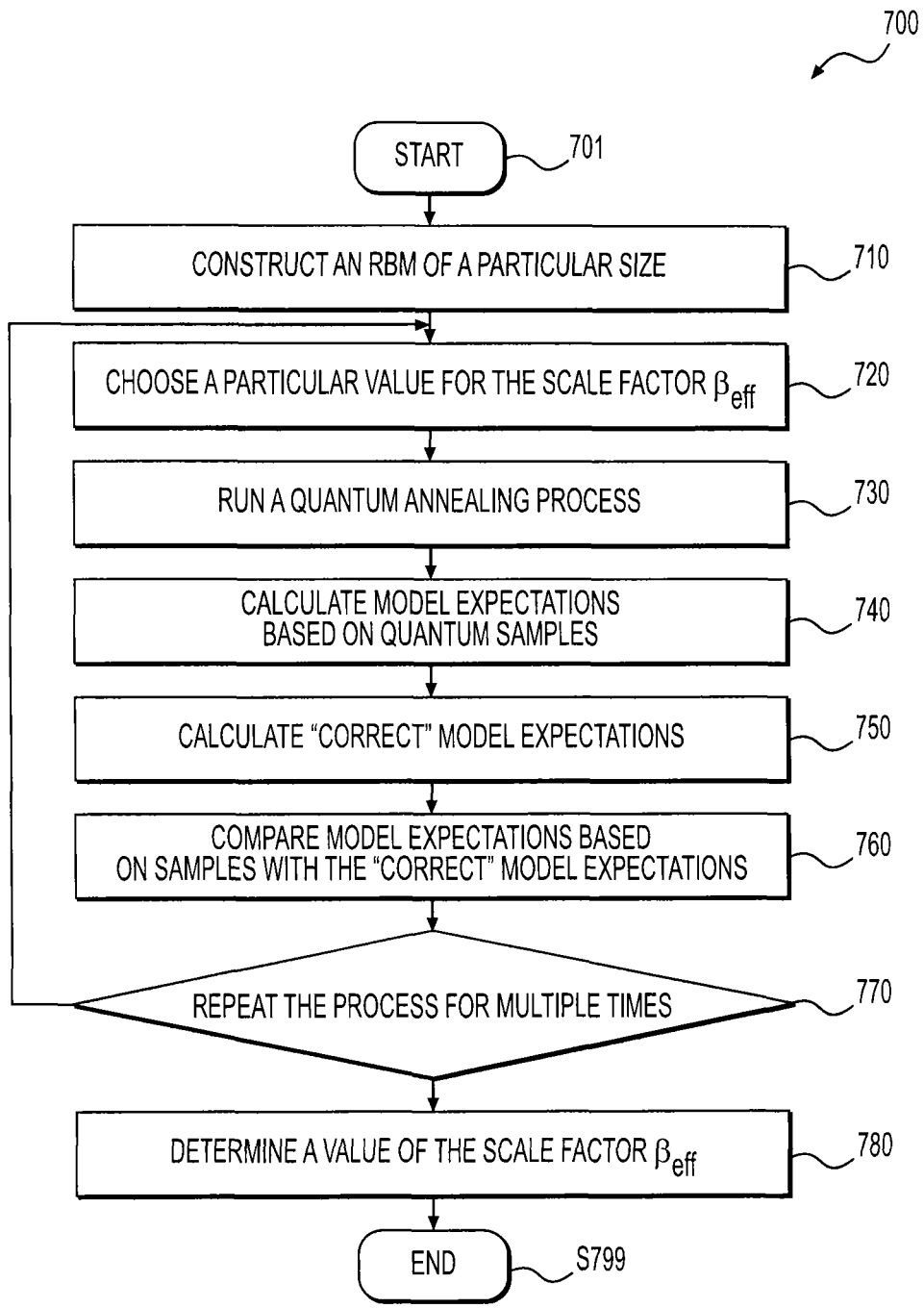
FIG. 7 shows a flow chart describing a process for calibrating a scale factor $\beta_{eff}$ used in a quantum-assisted training process according to an embodiment of the disclosure.

FIG. 7 shows a flow chart 700 describing a process for calibrating a scale factor $\beta_{eff}$ used in a quantum-assisted training process according to an embodiment of the disclosure. As described above the scale factor $\beta_{eff}$ is used when the distribution of final states of the QA device during a quantum annealing process is modeled as a Boltzmann distribution, $$P(S) = \frac{1}{Z}\exp(-\beta_{eff}\mathcal{H}_f(S)) \quad (8)$$

and the RBM energy functional (1a) is used as the final Hamiltonian $\mathcal{H}_f$. In order to calibrate the scale factor $\beta_{eff}$, the following process can be performed.

The process starts at S701 and proceeds to S710.

At S710, an RBM of a particular size is constructed.

At S720, a particular value for the scale factor $\beta_{eff}$ is chosen.

At S730, a quantum annealing process using a quotient of an energy functional of the RBM being divided by the scale factor $\beta_{eff}$ as a final Hamiltonian is performed to generate quantum samples.

At S740, model expectations are calculated based on the quantum samples generated at S730 using formulas (10a)-(10c).

At S750, "correct" model expectations of the constructed RBM based on the energy functional of the RBM are calculated using formulas (6a)-(6d). In an example, an RBM having a size of 16/16 is constructed with random weights and biases, and the model expectations $\langle v_i h_i \rangle_{model}$ are calculated using brute force evaluating all 2^(16+16) possible configurations.

At S760, model expectations based on the quantum samples are compared with the "correct" model expectations of the constructed RBM.

At 770, the process proceeds to S720, and is repeated for multiple times, for example N times.

At 780, a value of the scale factor $\beta_{eff}$ is determined that leads to the smallest difference between model expectations based on the quantum samples and "correct" model expectations based on the energy functional of the RBM.

What is claimed is:
1. A method, comprising:
mapping each node of a neural network having a plurality of nodes and a plurality of connections between the nodes to a qubit in a Quantum Annealing (QA) device, the QA device having a plurality of qubits and a plurality of couplers at overlapping intersections of the qubits, by configuring each qubit of the QA device with a bias;

mapping each connection of the neural network to a coupler in the QA device, by configuring each coupler of the QA device with a weight;

calibrating a scale factor βeff for generating quantum samples from a quantum annealing process;

generating the quantum samples from the qubits in the QA device using the calibrated scale factor βeff;

averaging the quantum samples to calculate a model expectation; and reconfiguring the qubits and the couplers with updated biases and weights based on the model expectation.

2. The method of claim 1, further comprising:
mapping a node of the neural network to a chain of qubits.

3. The method of claim 2, wherein mapping the node of the neural network to the chain of qubits includes:
configuring a coupling between qubits in the chain to be a ferromagnetic coupling.

4. The method of claim 1, wherein the neural network is a deep learning neural network.

5. The method of claim 1, further comprising:
configuring a coupler associated with a faulty qubit in the QA device with a zero weight; and
setting a connection associated with a node in the neural network that is mapped to the faulty qubit with a zero weight.

6. The method of claim 2, further comprising:
discarding quantum samples that include states of qubits in a chain of qubits that disagree with each other when a sample average is computed.

7. The method of claim 2, further comprising:
using a state value of majority qubits that agree with each other in a chain of qubits including a faulty qubit as a state value of the chain of qubits in a quantum sample when a percentage of qubits in each chain of qubits that agree is greater than a voting threshold parameter in the quantum sample.

8. The method of claim 1, further comprising:
applying a gauge transformation to the qubits of the QA device, wherein the gauge transformation inverts signs of a subset of the biases and weights.

9. The method of claim 8, wherein the gauge transformation is a basket weave gauge transformation.

10. The method of claim 8, wherein applying the gauge transformation to the qubits of the QA device includes:
generating the quantum samples from the qubits in the QA device with multiple different gauge transformation arrangements.

11. The method of claim 10, wherein the multiple different gauge transformation arrangements include at least one of:
an identity transformation where no qubits are inverted;
a basket weave gauge transformation where a first half of qubits in the QA device are inverted and a second half of qubits are not inverted;
a complement of the basket weave gauge transformation where the second half of the qubits in the QA device are inverted and the first half of the qubits are not inverted; and
a negative of the identity transformation where all qubits are inverted.

12. The method of claim 1, wherein calibrating the scale factor βeff includes:
constructing a restricted Boltzmann machine (RBM) of a particular size;
choosing a particular value for the scale factor βeff;
performing the quantum annealing process to generate the quantum samples using a quotient of an energy functional of the RBM being divided by the scale factor βeff as a final Hamiltonian;
repeating choosing a particular value, performing a quantum annealing process for multiple times; and
determining a value of the scale factor βeff that leads to the smallest difference between model expectations of the RBM based on the quantum samples and model expectations of the RBM based on the energy functional of the RBM.

13. The method of claim 12, wherein calibrating the scale factor βeff further includes:
calculating model expectations of the RBM based on the quantum samples;
calculating model expectations of the RBM based on the energy functional of the RBM; and
comparing model expectations of the RBM based on the quantum samples with model expectations of the RBM based on the energy functional of the RBM.

14. The method of claim 1, further comprising:
training the neural network using the quantum annealing (QA) device, where an original restricted Boltzmann machine (RBM) of one layer of the neural network is mapped onto the QA device that is configured to act as a quantum RBM, the training comprising:
calculating the updated biases and weights for the original RBM and the quantum RBM with a classical computer based on the quantum samples; and
using the updated biases and weights to generate additional quantum samples, each additional quantum sample corresponding to a final state of one of the qubits after a QA process of the QA device.

15. The method of claim 14, further comprising:
initializing the biases and the weights of the original RBM and the quantum RBM to random values.

16. The method of claim 14, wherein generating quantum samples at the QA device includes:
using a quotient of an energy functional of the RBM being divided by the scale factor βeff as a final Hamiltonian for a quantum annealing process at the QA device; and
running the quantum annealing process for multiple times to generate multiple quantum samples.

17. The method of claim 14, further comprising repeating calculating updates to biases and weights, and using the updates to the biases and weights.

* * * * *